či3,085,492
Patented Apr. 16, 1963

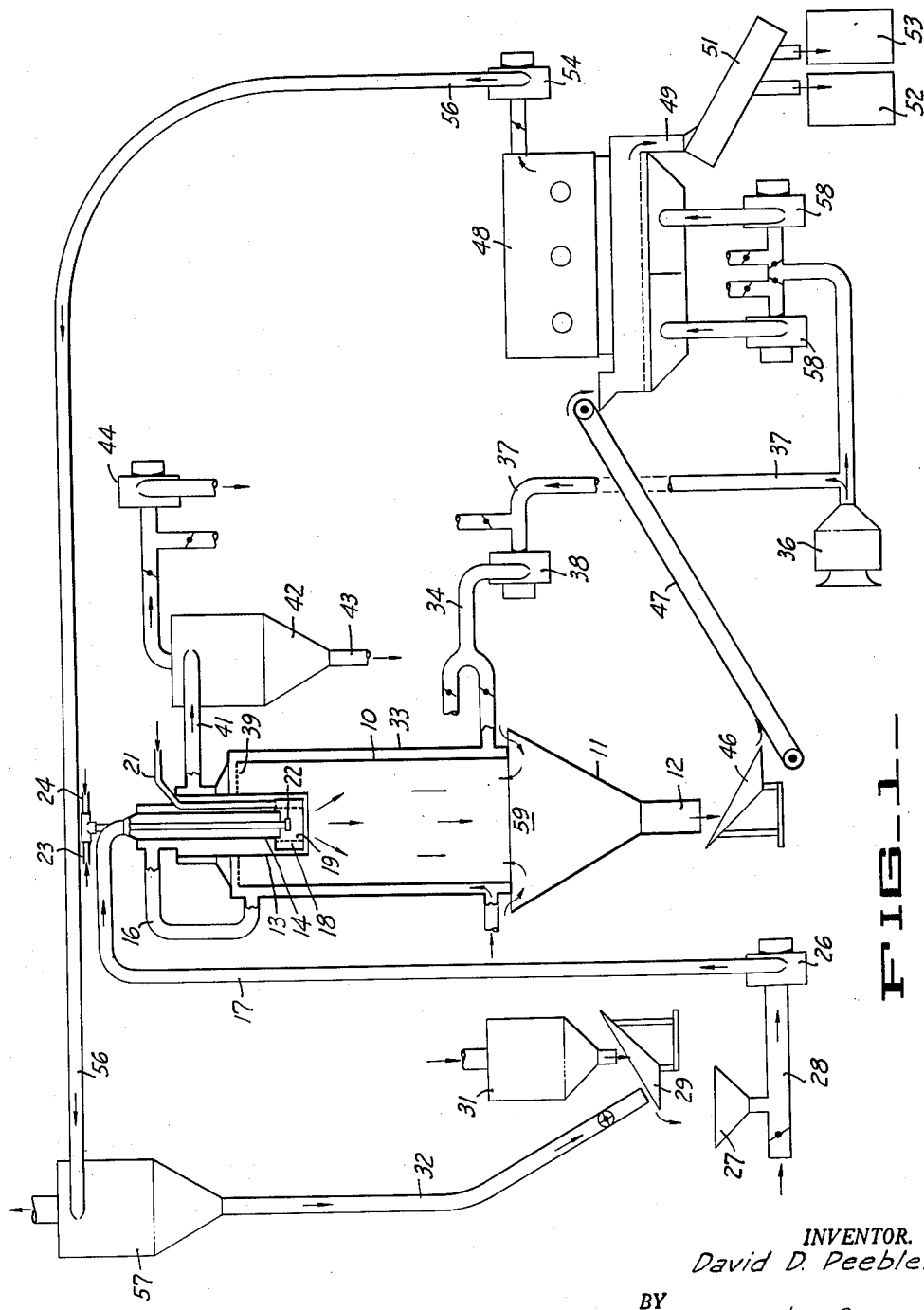
FIG_1

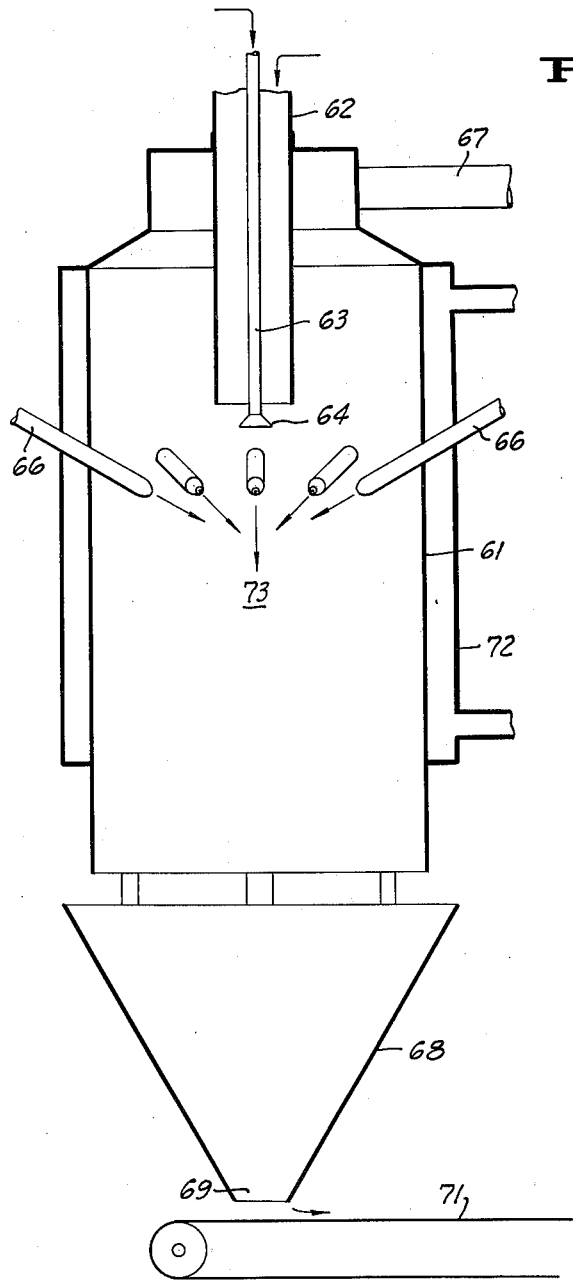

3,085,492
APPARATUS FOR THE TREATMENT OF DRY POWDERED MATERIALS
David D. Peebles, Davis, Calif., assignor to Western Condensing Company, Petaluma, Calif., a corporation of California
Filed Mar. 26, 1956, Ser. No. 573,910
5 Claims. (Cl. 99—234)

This invention relates generally to apparatus for the treatment of dry powdered materials to form products comprising aggregates having a size substantially greater than the size of the original powder particles. The present application is a continuation-in-part of subject matter disclosed and claimed in my copending application Serial No. 370,420, filed July 27, 1953, now Patent No. 2,835,586, granted May 20, 1958, and entitled "Dried Milk Product and Method of Making Same."

In my aforesaid copending application 370,420, there is disclosed a method for the treatment of dry milk powder to produce a product in the form of porous aggregates characterized by high wettability and ease of dispersion in water to form a reconstituted milk. The apparatus described and claimed herein is applicable to carry out the method and produce the product disclosed and claimed in said application 370,420. In addition it is applicable to the treatment of various materials for the manufacture of various products.

In general it is an object of the invention to provide apparatus of the above character capable of treating materials for the manufacture of dried products comprising random aggregates.

Another object of the invention is to provide apparatus of the above character which operates continuously to form moist aggregates, and which handles and removes excess moisture without grinding or crushing.

Another object of the invention is to provide apparatus of the above character capable of operating continuously with a minimum amount of supervision.

Another object of the invention is to provide apparatus of the above character which in its application to various types of food products, will not impair desirable components of the food product under treatment, such as solubility of milk protein present.

Additional objects and features of the invention will appear from a following description in which the preferred embodiments have been set forth in detail in conjunction with the accompanying drawing.

Referring to the drawing:
FIGURE 1 is a schematic view illustrating equipment incorporating the present invention.
FIGURE 2 is a side elevational view in section schematically illustrating a modified form of hydrating equipment incorporated in the apparatus of FIGURE 1.

The apparatus illustrated in FIGURE 1 consists of a treatment chamber 10, which in this instance is disposed on a vertical axis and is circular in horizontal section. The lower end of this chamber extends into the collecting cone 11, which has a lower open discharge conduit 12.

A pair of concentric conduits or casings 13 and 14 extend downwardly through the top wall of the chamber, and the upper end of conduit 13 connects with the exterior conduit 16. The upper end of conduit 14 connects with the feed conduit 17, whereby air and powdered material to be treated are introduced into the chamber. The lower open end of conduit 13 terminates at a level somewhat below the lower open end of conduit 14. In a region immediately below the conduit 14, there is an annular member 18, the inner wall of which is provided with a plurality of small perforations 19. Member 18 is connected to the steam supply pipe 21 whereby wet steam is discharged from the perforations 19 to form a hot moist atmosphere (i.e. vapor) which envelops powder being delivered downwardly from the conduit 14. Within the annular member 18, and likewise a short distance below the lower end of the conduit 14, there is an atomizing nozzle 22 connected to the water and air supply pipes 23 and 24. By the use of air under pressure a fine water mist can be delivered by nozzle 22 to intermingle with the steam or water vapor.

The means illustrated for introducing powder to be treated includes the blower 26 and the feed funnel or hopper 27, by means of which material can be introduced into the intake conduit 28 of the blower. A vibrating feeder table 29 serves to supply powder at a regulated rate to the hopper 27. A storage hopper 31 is shown for supplying powder to the feeder 29. Return fines may also be supplied to the table 29 through the conduit 32.

The side walls of the chamber 10 are preferably heated to a temperature above the dew point, in order to avoid any condensation of moisture upon the inner surfaces of the same. Thus a jacket 33 is shown about the side walls of the chamber, and the lower end of this jacket is connected to the hot air supply conduit 34. Hot air is supplied to conduit 34 from a suitable source, such as the air heater 36, conduit 37, and blower 38. In a typical instance where milk powder is being treated, the temperature of this air may be of the order of from 90 to 140° F. The jacket space may communicate with the upper end of the chamber 10 through transverse bars 39, and also with the conduit 16. The upper end of the chamber above the bars 39 communicates with the exhaust conduit 41. Air delivered through conduit 16 passes downwardly through conduit 13 to envelop the powder, after the powder has been moistened. Air removed through conduit 41 passes through cyclone 42, whereby any fine powder carried by this air is removed by way of conduit 43. The cyclone connects with the fan 44 which discharges to atmosphere.

The conduit 12 at the lower end of the cone 11 delivers aggregated material upon the vibrating table feeder 46, which delivers it to suitable conveying means, such as the belt conveyer 47. If desired, conduit 12 may deliver the aggregates directly onto belt 47, as will be presently described with reference to FIGURE 2. Conveyor 47 holds the material in transit in a quiescent uncompressed mass for a period of time determined by its length and speed of movement, and delivers the material to a drier 48 of the shaker screen type. The discharge conduit 49 from this drier delivers the material to the screen 51, which can break the larger aggregates and separate the material into two fractions 52 and 53. The fraction 52 is the desired product, and is of sufficient size to remain upon the screen. The reject material 53 consists of fine material which passes through the screen. The screen in a typical instance may be about 80 mesh.

Air is exhausted from the shaker drier 48 through the blower 54 and conduit 56. This conduit discharges into the cone 57, and the fine powder separated in this cone is returned by way of conduit 32 to the shaker table 29. Thus material carried with the drying air from the drier 48 is returned to the process. Hot drying air is supplied to the drier 48 from the heater 36 by way of blowers 58.

The drier 48 preferably is of the type making use of a vibrating screen upon which the aggregates are delivered. The screen preferably consists of a plate having a plurality of small holes formed in the same and which is vibrated in such a manner as to apply vertical velocity components to the aggregates, as well as to move the aggregates toward the discharge conduit 49. The drying air is introduced into a chamber formed below the screen whereby the hot air jets upwardly through the openings to pass through the working layer of aggregates upon the screen. The bulk of the material is of such particle size that it is not carried through the fan 54 by the air currents. Relatively fine material however is carried with the airstream and ultimately delivered by conduit 32 to the table feeder 29.

By way of example operation of the apparatus will be described as applied to dried skim milk powder. Conventional methods for the manufacture of skim milk powder involve concentration of edible skim milk by vacuum evaporation, followed by spray drying of the concentrate. In a typical instance the powder may analyze about 36% protein, 52% lactose, 8% ash, and 4% total moisture. Such powder contains amorphous lactose and is composed mainly of single particles (such as whole or broken spheres) less than 60 microns in size. When it is attempted to reconstitute such powder in water, the powder resists wetting and tends to form sticky masses or lumps. By extended and vigorous agitation, such as by shaking or mechanical beating, it is possible to reconstitute the powder in water, but this is time consuming and inconvenient.

As disclosed in Patent No. 2,835,586, it is possible to process such milk powder whereby the individual powder particles are moistened to make them sticky, the resulting sticky particles caused to contact and permanently adhere together in the form of moist porous random aggregates of a size substantially greater than the size of the original powder particles, and thereafter excess moisture removed without subjecting the aggregates to crushing or grinding, whereby the final product produced is a free-flowing granular material. The apparatus of the present application can be used for carrying out the process of said Patent No. 2,835,586. Thus assuming that the apparatus is in continuous operation, sufficient steam or water vapor together with atomized water issues from the openings 19 and also 22 to provide an atmosphere of water vapor and water droplets in a localized treatment zone immediately below the open end of conduit 14. As the powder is delivered from the lower end of conduit 14, together with the conveying air which may be at room temperature, water collects upon the surfaces of the dispersed particles. The balance between the rate of powder feed and the amount of moisture supplied and the balance between moisture supplied by the nozzle 22 and steam or water vapor through openings 19 are so regulated that the material issuing from conduit 12 has a total moisture content of the order of from 10 to 20%, about 15% being considered optimum for this particular type of powder. The material issuing from the conduit 12 has an apparent volume several times that of the stream of material being fed from vibrating table 29. The balances between rate of powder feed, rate of water feed, and rate of steam feed, are so regulated as to produce a maximum increase in bulk of the material issuing from conduit 12. If too much moisture is being introduced, it becomes rapidly apparent by a decrease in the apparent bulk of the material as it issues from conduit 12.

The moisture applied to the powder particles within the chamber 10 serves to make the surfaces of the powder particles sticky, and as the sticky particles are commingled, random contacts occur to form the moist porous aggregates. After passing through the localized zone at the lower end of conduit 13 where moisture is applied, the material enters the main part of the chamber 10, where it is enveloped in the warm air being continuously introduced into the chamber by way of conduit 13. This warm air serves to sustain the temperature of the powder.

The moist material undergoing treatment falls downwardly through the chamber 10 and ultimately reaches the cone 11. As indicated by the arrows, as it reaches the upper end of the cone 12 it is commingled with the cooler atmospheric air entering by way of the space 59 between the upper end of the cone and the lower end of the chamber 10. Under proper operating conditions no substantial amount of the material clings to the walls of either the chamber 10 or the cone 11. In other words, the material continues to fall downwardly in free flight until it is delivered by the conduit 12 to the feeder table 46. Although the material as initially delivered from conduit 12 may in a typical instance be at a temperature of the order of 100° F., its temperature gradually falls after being delivered to the table 46, and as it is being moved by the conveyer 47. While in transit on the conveyor 47 the aggregates are in a quiescent uncompressed mass for a period of time up to several minutes, during which time they become more firm, less sticky, and relatively free-flowing. The aggregates now have sufficient strength for handling and drying without serious breakup or crushing. In the shaker drier 48 excess moisture is removed in the manner previously described, to produce the desired final product.

The skim milk powder is fed to the apparatus by way of the table feeder 29, together with crystallized lactose powder, or fines returned by way of conduit 32. Alternately, skim milk powder previously blended with lactose powder, fines from the shaker drier, or reject material from the screen 51, or any of these, may be fed to the apparatus by way of the table feeder 29.

Powder from any suitable source can be supplied to the hopper 31, and the discharge from this hopper arranged whereby table 29 feeds at a substantially even rate to the hopper 27. As previously indicated, it is desirable to maintain a constant feed of powder to facilitate regulation of the steam and atomized water. In general, introduction of too much moisture results in too high a total moisture content whereby the material tends to form a doughy mass rather than a fluffy stream of aggregates and cannot be dried to form a satisfactory product. An insufficient amount of moisture also causes the material delivered at 18 to be unsatisfactory. Application of too much steam in proportion to the atomized water tends to cause the powder to be heated to an excessive temperature, thus tending to cause some undesired coagulation of milk protein.

In the shaker drier 48, the powder is continuously agitated while excess moisture is being removed, but such agitation is insufficient to cause any serious amount of crushing or grinding of the aggregates. It suffices to avoid formation of lumps, whereby the finished product is free-flowing and in proper condition for bagging or packaging.

Assuming use of the apparatus for the processing of the skim milk powder in the manner described above, a novel product is obtained as disclosed and claimed in said Patent No. 2,835,586. Briefly the particles of the final product are in the form of aggregates formed by a cementing together of the original powder particles, and the aggregates are relatively porous. The size of the aggregates may vary although more than about 50% (by weight) (80% in a typical instance) remains on a 200 mesh screen and are of a size in excess of 74 microns. In contrast, 80% of the particles in conventional skim milk powder pass through a 200 mesh screen. The aggregates have sufficient strength for handling and packaging without serious crushing. The specific gravity of the finished product is of the order of from 0.27 to 0.39 (preferably 0.32), as distinguished from about 0.6 for ordinary skim milk powder. The solubility index is substantially the same as that of the original powder and the extent of hydration of the lactose content is 30 to 62%. Such a product is free-flowing and has relatively high wettability. Thus when a spoonful of the product is dropped into a tumbler containing a quantity of water, it wets and sinks almost immediately, and simple stirring by means of a spoon, or moderate shaking, serves to disperse the material to form a stable reconstituted milk.

The apparatus described above can be used for the treatment of materials other than skim milk powder, to produce final products in the form of porous aggregates. In general it is applicable to materials in dry powdered form capable of being dispersed in an air stream, and which when moistened from sticky particles capable of adhering together in the form of moist porous aggregates. The products resulting from treatment in my apparatus may be characterized by enhanced wettability, ease of dispersibility in water and/or better free-flowing characteristics. By way of example reference can be made to the treatment of spray dried edible whey powder, dry milk powder having some fat content, and mixtures of dry milk powder together with sugar and chocolate ingredients as disclosed in my copending application Serial No. 514,831, filed June 13, 1955, and entitled "Powdered Chocolate Flavored Product and Process of Manufacture."

FIGURE 2 shows another embodiment of the hydrating and aggregating unit. In this instance the chamber 61 has its upper end communicating with the downwardly extending conduit 62 by means of which the material to be treated together with a conveying stream of air is introduced. Water is introduced by way of pipe 63 and the atomizing nozzle 64. Steam is introduced into the region below the nozzle 64 by way of pipes 66. A stream of warm air is continuously exhausted from the upper part of the chamber 61 by way of conduit 67. A cone 68 at the lower end of the treatment chamber directs the material to the discharge opening 69, to deposit it upon the endless belt conveyer 71. The side walls of the chamber 61 are enclosed by the jacket 72, through which warm air can be circulated to maintain the side walls of the chamber at a sufficiently elevated temperature to avoid condensation of moisture upon the same.

The hydrating and aggregating unit shown in FIGURE 2 operates in substantially the same manner as the apparatus of FIGURE 1. The stream of powdered material being introduced continuously into the chamber through the lower open end of conduit 62, passes downwardly about the nozzle 64 and into the moist zone 73 into which the atomized water and steam are being introduced. As a result individual particles of powder become moist and sticky, and random contacts between the moist particles causes them to adhere together in the form of relatively larger moist porous aggregates. The moist porous aggregates pass downwardly from the chamber 61, and are directed through opening 69 to be deposited at a quiescent uncompressed mass upon the belt conveyer 71. While in transit upon the conveyer 71, the moist porous aggregates are held for such period of time that they become more firm and less sticky. The discharge end of the conveyer 71 delivers the aggregates as a free-flowing material to the drier where excess moisture is removed.

The embodiment shown in FIGURE 2 is disclosed but not claimed in my copending applications Serial No. 466,355 filed November 2, 1954, now abandoned, and 514,831, filed June 13, 1955, now Patent No. 2,850,388, granted September 2, 1958.

In addition to use of the apparatus on dairy and dairy-type products, the apparatus can be used for instantizing various non-dairy products such as pectin, as disclosed in my copending application 550,679, filed December 2, 1955, now abandoned in favor of application Serial 577,466 filed April 11, 1956, now Patent 2,856,288 granted October 14, 1958 (continuation-in-part of said application 550,679) starch, as disclosed in my copending application Serial No. 550,696, filed December 2, 1955, now Patent No. 2,856,290, granted October 14, 1958 and coffee as disclosed in my copending application Serial No. 564,397, filed February 9, 1956, now Patent No. 2,897,084, granted July 28, 1959.

I claim:

1. In apparatus for treating powdered products to form porous aggregates from powder particles, a treatment chamber having inlet and discharge openings, said chamber being constructed to form an unobstructed space between said openings for free movement of dispersed material from the inlet to the outlet opening, conduit means for continuously introducing a stream of air and dispersed powdered material into the inlet opening of the chamber whereby dispersed powder progresses continuously through the chamber to the outlet opening, means for continuously introducing moisture into the chamber in a region between the inlet and outlet openings whereby the powder moving therethrough is moistened and the particles made sticky and caused to adhere together as uncompacted moist porous aggregates, means for continuously receiving the moist porous aggregates discharging from the outlet opening of the chamber, and means remote from said chamber for handling and removing excess moisture from the removed porous aggregates without substantial compacting or crushing of the same.

2. Apparatus as in claim 1 in which the means for receiving the moist porous aggregates includes a conveyer upon which the aggregates are deposited and which serves to convey the same as a quiescent mass between said outlet and the means for removing excess moisture, said last means being remote from said chamber outlet.

3. Apparatus as in claim 2 in which the means for introducing moisture includes an atomizing nozzle for introducing atomized water and separate means for introducing steam.

4. In an apparatus for treating powdered products to form porous aggregates from powder particles, an upright treatment chamber having an upper inlet and a lower discharge opening, said chamber being constructed to form an unobstructed space between said openings for free movement of dispersed material from the inlet to the outlet opening, conduit means for continuously introducing a stream of air and dispersed powdered material into the inlet opening of the chamber whereby the powder progresses continuously downwardly through the chamber to the outlet opening, means for continuously introducing hot water vapor and atomized water into a region of the chamber intermediate the upper inlet and lower outlet whereby the powder moving therethrough is moistened and the particles are made sticky and caused to adhere together in the form of moist porous aggregates, means for introducing cool air into the chamber in a region intermediate the first named region and the lower outlet whereby the moist porous aggregates fall downwardly through a cooler region before being discharged, conveying means for collecting and receiving moist porous aggregates discharging from the outlet, said conveying means serving to convey the moist porous aggregates in a quiescent mass for an appreciable time period, and drying means remote from said chamber receiving porous aggregates from said conveying means and serving to remove excess moisture from the same without substantial crushing.

5. Apparatus as in claim 4 together with additional means for withdrawing air from the upper end of the chamber and above the level of the inlet opening.

References Cited in the file of this patent

UNITED STATES PATENTS

| 1,928,135 | Peebles et al. | Sept. 26, 1933 |
| 2,016,592 | Chuck | Oct. 8, 1935 |
| 2,157,839 | Wertheimer | May 9, 1939 |
| 2,561,394 | Marshall | July 24, 1951 |